US010530709B2

(12) United States Patent
Boynes et al.

(10) Patent No.: US 10,530,709 B2
(45) Date of Patent: *Jan. 7, 2020

(54) CONTAINER CONTRACT FOR DATA DEPENDENCIES

(71) Applicant: Amazon Technologies, Inc., Seattle, WA (US)

(72) Inventors: Jeremy Boynes, Mercer Island, WA (US); Josh Z. Curry, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 898 days.

This patent is subject to a terminal disclaimer.

(21) Appl. No.: 14/802,550

(22) Filed: Jul. 17, 2015

(65) Prior Publication Data
US 2015/0326501 A1    Nov. 12, 2015

Related U.S. Application Data

(63) Continuation of application No. 13/469,789, filed on May 11, 2012, now Pat. No. 9,088,463.

(51) Int. Cl.
G06F 15/173 (2006.01)
H04L 12/911 (2013.01)
H04L 29/08 (2006.01)

(52) U.S. Cl.
CPC ......... *H04L 47/827* (2013.01); *H04L 67/10* (2013.01); *H04L 67/142* (2013.01); *H04L 67/2842* (2013.01)

(58) Field of Classification Search
None
See application file for complete search history.

(56) References Cited

U.S. PATENT DOCUMENTS

| 7,302,462 | B2 | 11/2007 | Kulp et al. |
| 7,472,391 | B2 | 12/2008 | Alcazar et al. |
| 8,024,733 | B2 | 9/2011 | Hambrick et al. |
| 8,380,932 | B1 | 2/2013 | Martin et al. |
| 8,417,764 | B2 | 4/2013 | Fletcher et al. |
| 8,447,829 | B1 * | 5/2013 | Geller ............ G06F 9/468 709/217 |
| 8,458,331 | B2 | 6/2013 | Chauhan et al. |
| 8,543,972 | B2 | 9/2013 | Chen et al. |
| 2002/0069236 | A1 | 6/2002 | Jahnke |
| 2004/0059749 | A1 | 3/2004 | Frey et al. |
| 2008/0072235 | A1 * | 3/2008 | Rodgers ............ G06F 9/44521 718/108 |
| 2009/0077477 | A1 | 3/2009 | Khan et al. |
| 2009/0193440 | A1 | 7/2009 | Arthursson et al. |
| 2009/0254926 | A1 * | 10/2009 | Kim ................ G06F 9/465 719/328 |
| 2009/0276771 | A1 * | 11/2009 | Nickolov ............ G06F 9/4856 717/177 |

(Continued)

*Primary Examiner* — Phyllis A Book
(74) *Attorney, Agent, or Firm* — Thomas | Horstemeyer, LLP

(57) ABSTRACT

Disclosed are various embodiments involving a container contract for data dependencies using representational state transfer (REST). A data resource is obtained by way of REST after determining that an application component has a dependency on the data resource. The application component is invoked to process the data resource. The data resource may be sent to the server by way of REST to effect a modification to the data resource in the server.

20 Claims, 7 Drawing Sheets

(56) References Cited

U.S. PATENT DOCUMENTS

| | | | |
|---|---|---|---|
| 2009/0292791 A1* | 11/2009 | Livshits | G06F 9/451 709/217 |
| 2010/0235472 A1* | 9/2010 | Sood | H04L 65/4092 709/219 |
| 2010/0299437 A1* | 11/2010 | Moore | H04L 67/1008 709/226 |
| 2011/0236873 A1 | 9/2011 | Bowers | |
| 2011/0302316 A1* | 12/2011 | Chou | H04L 67/02 709/228 |
| 2012/0030559 A1* | 2/2012 | Manion | G06F 8/61 715/234 |
| 2012/0054594 A1* | 3/2012 | Isaacson | G06F 17/30058 715/230 |
| 2012/0072465 A1 | 3/2012 | McGowan et al. | |
| 2012/0072534 A1 | 3/2012 | McColgan et al. | |
| 2012/0072541 A1 | 3/2012 | Carls et al. | |
| 2012/0124566 A1 | 5/2012 | Federighi et al. | |
| 2012/0158831 A1 | 6/2012 | Beaver et al. | |
| 2012/0174063 A1* | 7/2012 | O'Carroll | G06F 9/5055 717/116 |
| 2012/0203802 A1 | 8/2012 | Brown et al. | |
| 2012/0324034 A1* | 12/2012 | Burkhardt | G06F 17/30876 709/212 |
| 2012/0324069 A1* | 12/2012 | Nori | G06F 9/5066 709/222 |
| 2013/0091197 A1* | 4/2013 | Bar-Zeev | G06F 1/3203 709/203 |
| 2013/0124400 A1 | 5/2013 | Hawkett | |
| 2013/0139182 A1 | 5/2013 | Sethuraman et al. | |
| 2013/0152090 A1* | 6/2013 | Balko | G06F 9/52 718/102 |
| 2013/0159530 A1* | 6/2013 | James | G06F 17/30887 709/226 |
| 2013/0246266 A1* | 9/2013 | Coleman | G06Q 30/0641 705/44 |

* cited by examiner

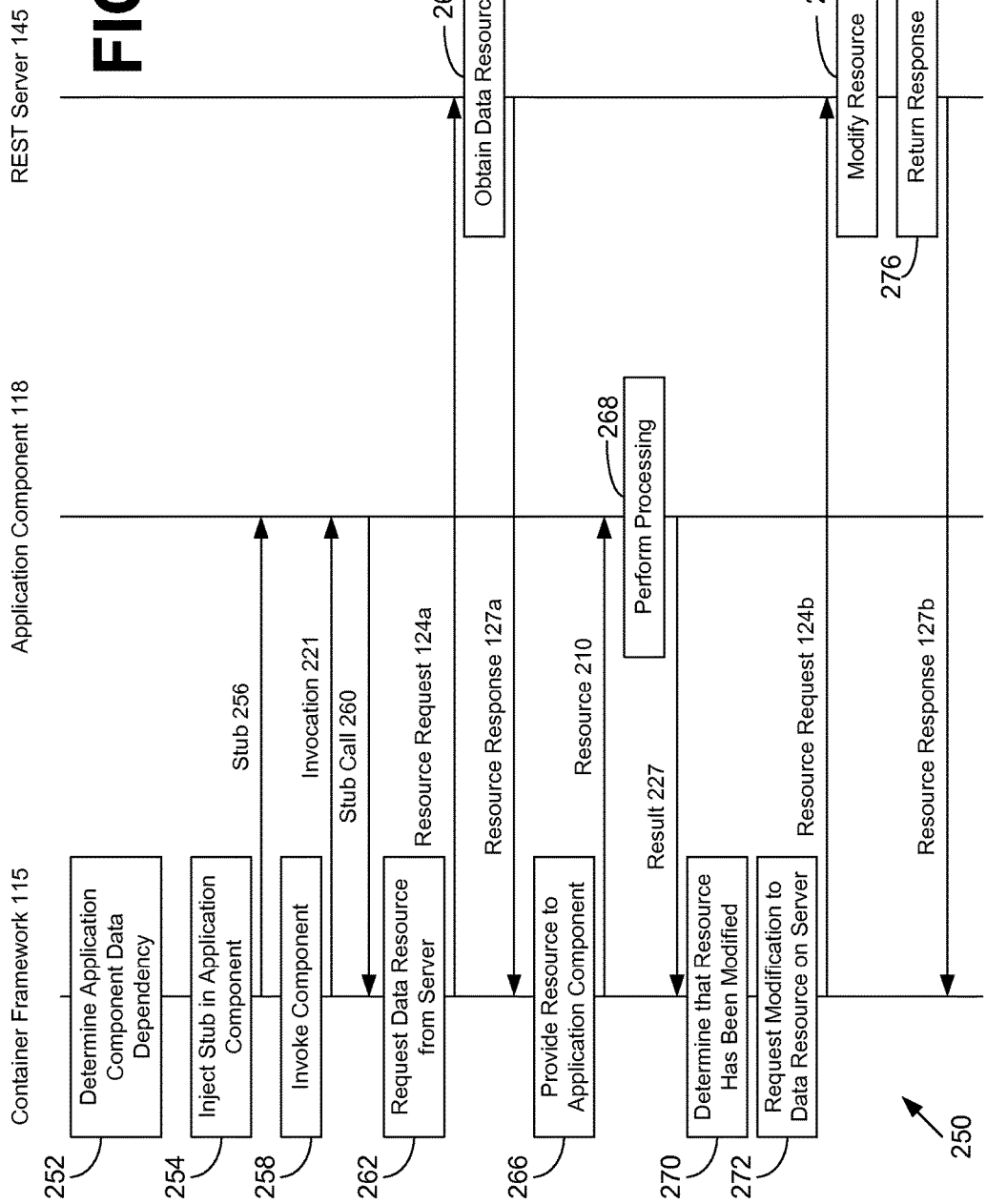

CONTAINER CONTRACT FOR DATA DEPENDENCIES

CROSS-REFERENCE TO RELATED APPLICATIONS

This application is a continuation of, and claims priority to, co-pending U.S. patent application entitled "CONTAINER CONTRACT FOR DATA DEPENDENCIES," filed on May 11, 2012, and assigned application Ser. No. 13/469,789, which is incorporated herein by reference in its entirety.

BACKGROUND

Representational state transfer (REST) is a design pattern for client-server architectures. Architectures embodying REST principles may be referred to as being "RESTful." In REST, clients send requests to servers, and servers return responses to clients. Requests and responses relate to the transfer of representations of resources. A resource may be any coherent and meaningful concept that may be addressed by a uniform resource identifier (URI). A representation of a resource may be, for example, a document that captures the current or intended state of the resource. One example of a RESTful architecture is hypertext transfer protocol (HTTP).

REST is a stateless architecture, where no client context is stored on the server between requests. Server-side state may be addressed as a resource. As with resources on the World Wide Web, REST resources are also cacheable. REST also provides a layered system that may facilitate load-balancing and shared caches. The uniform interface of REST enables each part to be developed independently. REST is distinguished from web services, simple object access protocol (SOAP), and remote procedure call (RPC) in that the latter are procedure oriented while REST is data oriented. Compared to service-oriented architectures, REST architectures may be more scalable and easier to maintain.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2A and 2B are sequence diagrams depicting interactions between a container framework, an application component, and a server executed in computing devices in the networked environment of FIG. 1 according to various embodiments of the present disclosure.

DETAILED DESCRIPTION

The present disclosure relates to providing a container contract for data dependencies using representational state transfer (REST). Various commercially available programming frameworks support component programming models. Client-side components typically interact with some kind of remote service via simple object access protocol (SOAP), remote procedure call (RPC), remote method invocation (RMI), or other forms of service interfaces. Resource-oriented architectures following the REST paradigm are concerned more with data than service-oriented architectures, which are concerned more with procedure calls. Components using REST have included logic to interact with a data store to obtain the data to make it available within the component. Despite using REST, the components have used library procedure calls in order to obtain the remote data and/or update the remote data, thereby imposing a service interaction aspect onto a resource oriented architecture.

Various embodiments of the present disclosure employ a contract where the component is presented with the data resource. The container obtains the data resource using REST and automatically presents the data resource to the component for processing. The component processing may involve modifying the data resource. If the data resource is modified, the container is configured to automatically update the data resource on the REST server. The updating may be configured using instructions obtained from the server using a level three RESTful interaction according to the Richardson Maturity Model for REST.

According to the abstraction employed in various embodiments of the present disclosure, the component is concerned only with processing the data and not server interactions to obtain or update the data. Consequently, the component itself does not have to initiate REST requests or process REST responses, which simplifies component development. In the following discussion, a general description of the system and its components is provided, followed by a discussion of the operation of the same.

Figure 1:
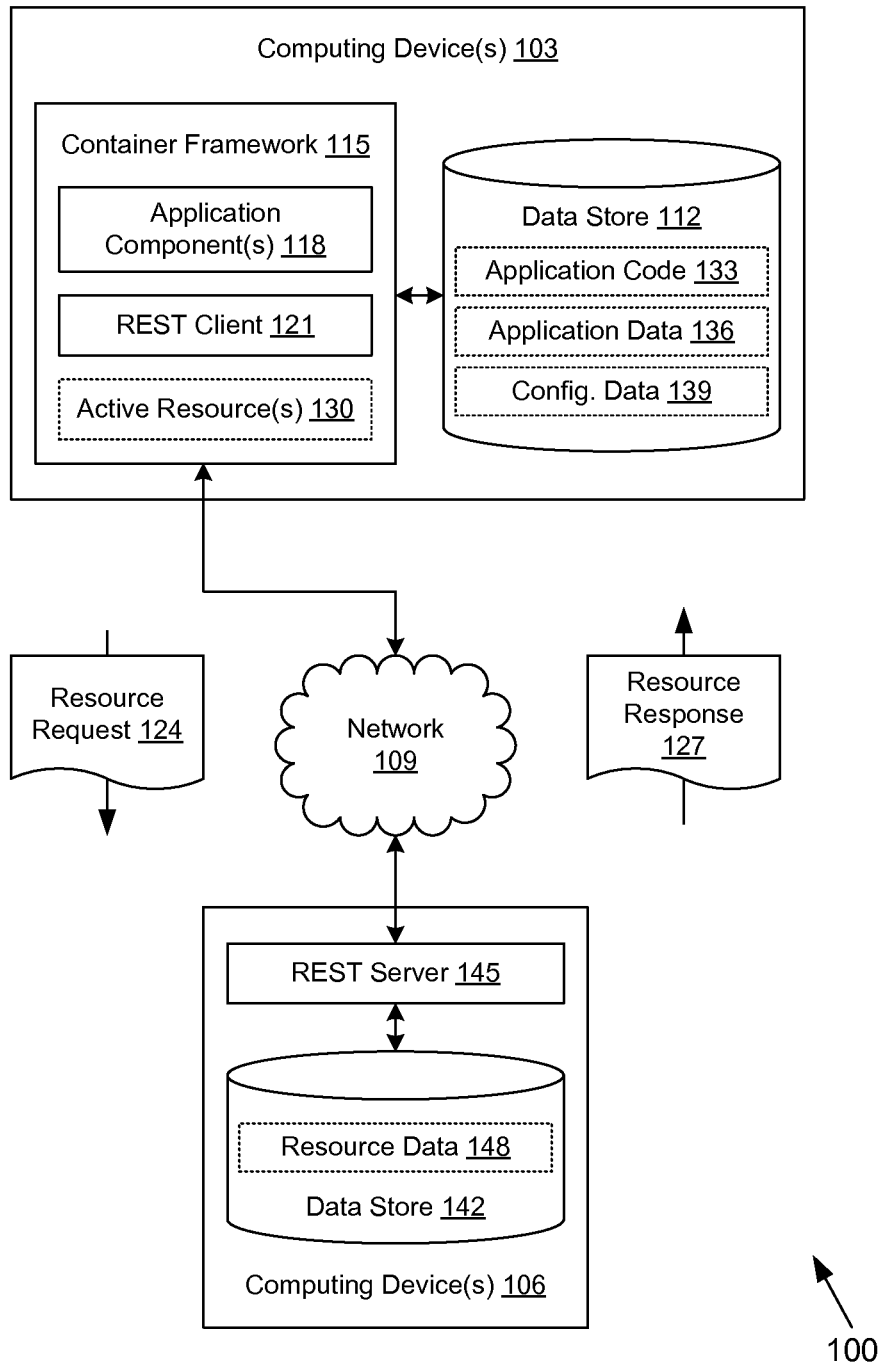
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer, client computer, or any other system providing computing capability. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. In some embodiments, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a container framework 115, one or more application components 118 executed under the container framework 115, a REST client 121 included in the container framework 115, and other applications, services, processes, systems, engines, or functionality not discussed in detail herein. The container framework 115 is executed to provide a managed component container environment for one or more application components 118. In various embodiments, the container framework 115 may correspond to a server-oriented framework or to a client-oriented framework. A client-oriented container framework 115 may operate, for example, in conjunction with a web browser or other client application.

The application components 118 may correspond to any problem-specific application code that is developed under a contract defined by the container framework 115. In various examples, the contract may involve an inversion-of-control design pattern. Inversion of control is a style of software construction where reusable code (i.e., the container framework 115) controls the execution of problem-specific code (i.e., the application components 118). Data dependencies of the application components 118 may be registered or predefined such that the container framework 115 is configured to obtain and/or update data resources according to the dependencies using REST and the REST client 121. For example, an application component 118 may correspond to a Java object, a JavaBean object, and/or other types of components.

The REST client 121 corresponds to logic that implements a client for a RESTful protocol such as, for example, hypertext transfer protocol (HTTP), and/or other RESTful protocols. The REST client 121 may support methods such as, for example, "GET," "PUT," "POST," "DELETE," and so on. The REST client 121 constructs a resource request 124 from a uniform resource identifier and/or a URI template with various parameters. In some cases, the URI is a uniform resource locator (URL). The REST client 121 sends the resource request 124 over the network 109 to a server and thereby obtains a resource response 127. The REST client 121 may then parse the resource response 127 and return the resulting representation of a data resource to the container framework 115. The container framework 115 obtains the active resource 130 from the resource response 127. The container framework 115 makes the active resource 130 available to the application component 118 when the application component 118 is invoked.

The data stored in the data store 112 includes, for example, application code 133, application data 136, configuration data 139, and potentially other data. The application code 133 corresponds to user-configured code which is instantiated into the application components 118. The application data 136 corresponds to locally stored data which may be loaded and/or stored by the application components 118. The configuration data 139 may include parameters that configure the operation of the container framework 115 and/or the application components 118. Such parameters may include definitions of data dependencies of the application components 118 under the container contract.

The computing device 106 may comprise, for example, a server computer or any other system providing computing capability. In some embodiments, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store 142 that is accessible to the computing device 106. The data store 142 may be representative of a plurality of data stores 142 as can be appreciated. The data stored in the data store 142, for example, is associated with the operation of the various applications and/or functional entities described below.

The components executed on the computing device 106, for example, include a REST server 145 and other applications, services, processes, systems, engines, or functionality not discussed in detail herein. The REST server 145 is executed to obtain resource requests 124 from REST clients 121 over the network 109 and to provide resource responses 127 to the REST clients 121 in fulfillment of the resource requests 124. The REST server 145 may, for example, correspond to a commercially available HTTP server such as Apache® HTTP Server, Apache® Tomcat®, Microsoft® Internet Information Services (IIS), and so on. The data stored in the data store 142 includes, for example, resource data 148 and potentially other data. The resource data 148 corresponds to server-side representations of data resources which may be obtained and/or updated by the REST server 145 in response to resource requests 124 from the REST clients 121.

Next, a general description of the operation of the various components of the networked environment 100 is provided. To begin, the container framework 115 and the application components 118 may be preconfigured through manual or automatic approaches. The application components 118 may register one or more data dependencies at run-time or before. Such data dependencies may depend on data available from one or more of the REST servers 145, which may be operated, for example, by different entities using different computing devices 106. In one embodiment, the data dependencies may be recorded as annotations in the configuration data 139, which may be associated with the container framework 115, the particular dependent application component 118, and/or both. A contract between the container framework 115 and the application components 118 may define the pattern of interaction between the container framework 115 and the application components 118 in this regard.

Upon determining that an application component 118 is to be invoked, the container framework 115 determines the data dependencies of the application component 118. The container framework 115 then obtains data resources to satisfy the data dependencies. The container framework 115 employs the REST client 121 to generate and send one or more resource requests 124 to one or more REST servers 145 over the network 109. The data dependencies may indicate uniform resource identifiers (URI) or templates for URIs corresponding to data resources available via REST.

The REST client 121 obtains resource responses 127 from the REST servers 145, which may, in some cases, include instructions for generating modification resource requests 124 for the given data resource, or data describing how to find such instructions. As a non-limiting example, suppose that a resource is a hypertext markup language (HTML) page containing certain information about the user. The modification instructions may include an HTML form for modifying the information of the HTML page. The HTML form may define a URI, a REST interaction method (e.g., "POST," etc.), and the various parameter names and types that can be provided as part of the form. Upon receiving the form data, the REST server 145 may be configured to update the data resource corresponding to the HTML page, which may involve a modification committed to the resource data 148.

Upon obtaining the data resource, the container framework 115 passes the data resource through a container injection mechanism to the application component 118 as the active resource 130. Where multiple data resources are obtained to satisfy multiple data dependencies, multiple active resources 130 may be provided to the application component 118. The container framework 115, rather than the application component 118, performs any negotiation, data conversion, data un-marshaling, and so on, relative to obtaining the data resource.

The container framework 115 may manage client-side caching of the active resource 130 according to REST. For example, in response to a resource request 124, the REST server 145 may indicate to the REST client 121 that the requested resource has not been updated since the last request. Accordingly, the REST client 121 and the container framework 115 may employ a locally cached copy of the requested resource. It is noted that the client-side caching may be implemented without any awareness or special action by the application components 118.

The container framework 115 invokes or executes the application component 118, and the application component 118 begins processing the active resources 130 that have been provided. Unlike traditional approaches to REST, the application component 118 does not access the active resource 130 by way of a call that maps directly to a REST operation. For example, the application component 118 does not call any particular method that generates a REST "GET" request or a "POST" request. That is to say, the active resource 130 is automatically provided and updated on behalf of the application component 118 by the container framework 115. Upon the application component 118 finishing processing the active resources 130, or upon the application component 118 returning control back to the container framework 115, the container framework 115 determines whether any of the active resources 130 that had been provided to the application component 118 have been modified.

For the active resources 130 that have been modified and have modification instructions, the container framework 115 using the REST client 121 issues modification resource requests 124 to the appropriate REST server 145. To this end, the container framework 115 may generate a new URI based at least in part on the modification instructions and the modified local copy of the active resource 130. The modification resource requests 124 may specify new or updated data for the modified active resources 130. The modification may pertain to creation, update, or deletion of an entity related to the active resource 130 that is managed by the REST server 145. The modification may affect other entities or resources in the resource data 148 which depend upon the modified entity. The REST server 145 processes the modification resource requests 124 and modifies the resource data 148. The REST server 145 may return a resource response 127 to the REST client 121 indicating whether the update was successful.

Figure 2A:
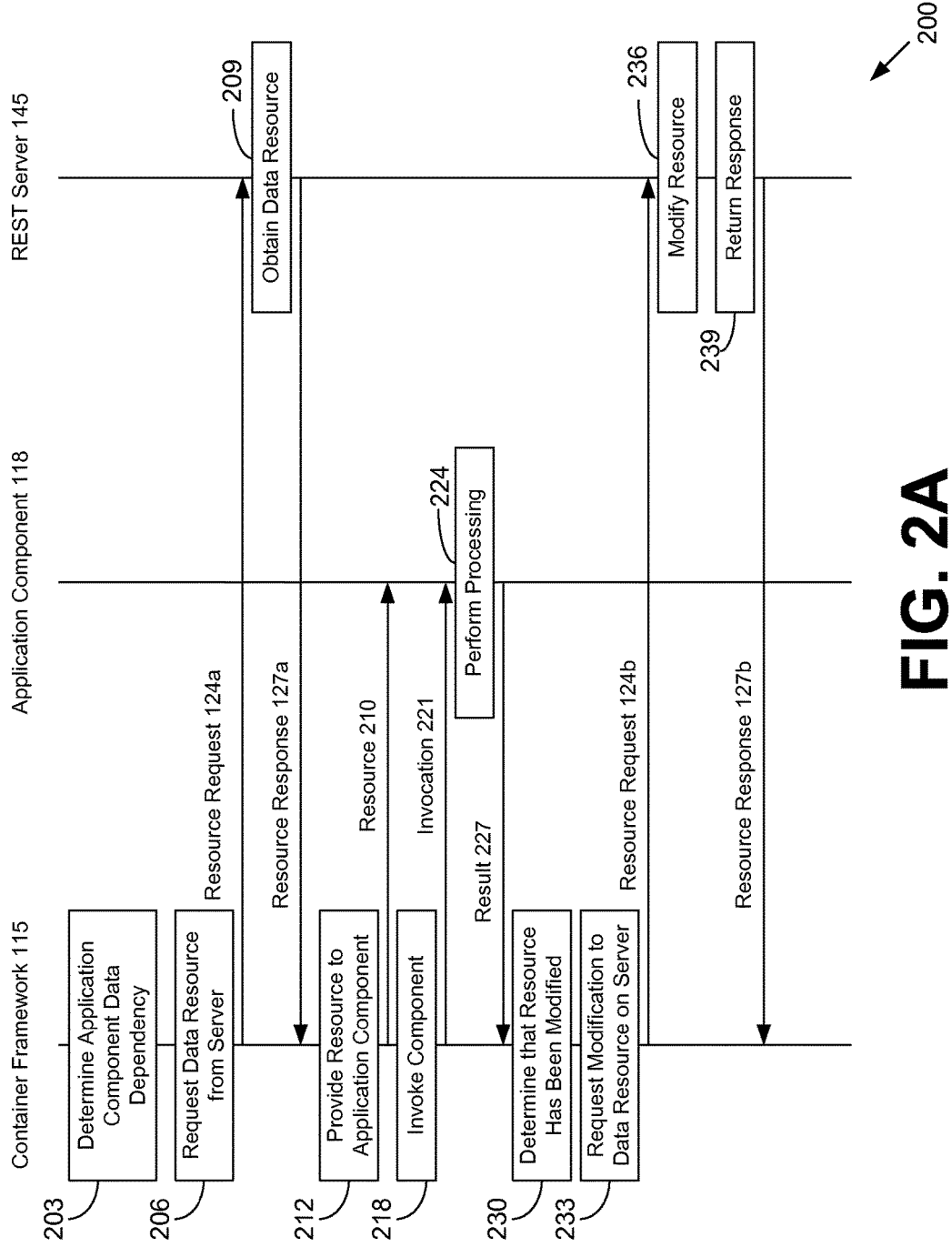

Turning now to FIG. 2A, shown is a sequence diagram 200 that provides an example of the interaction among the container framework 115, the application component 118, and the REST server 145 according to various embodiments. It is understood that the sequence diagram of FIG. 2A provides merely an example of the many different types of interaction that may be employed in the operation of the container framework 115, the application component 118, and the REST server 145 as described herein. Alternatively, the sequence diagram of FIG. 2A may be viewed as depicting steps of an example method implemented in the various computing devices 103 and 106 (FIG. 1) in the networked environment 100 (FIG. 1) according to various embodiments.

Beginning with box 203, the container framework 115 determines a data dependency of the application component 118. Such a determination may be made with reference to the configuration data 139 (FIG. 1) or through a registration call made by the application component 118 or another entity. In box 206, the container framework 115 requests a data resource from the REST server 145 to fulfill the data dependency. A resource request 124a is thereby sent over the network 109 (FIG. 1) to the REST server 145.

In box 209, the REST server 145 obtains the data resource in response to the resource request 124a. In so doing, the REST server 145 may access and/or update resource data 148 (FIG. 1) stored in the data store 142 (FIG. 1). Further, the REST server 145 may make any number of calls to various other services executing on the same computing device 106 or a different computing device 106. The REST server 145 returns the resource response 127a to the container framework 115 over the network 109 in response to the resource request 124a. The resource response 127a includes the requested resource 210 or an error message. In some cases, the resource response 127a may be a level three REST message having instructions for updating the included data resource 210.

In box 212, the container framework 115 provides the data resource 210 obtained from the resource response 127a to the application component 118 as the active resource 130 (FIG. 1), which is a local copy in the computing device 103 which is capable of modification by the application component 118. To this end, the container framework 115 may provide the resource 210 via a predefined injection site of the application component 118, e.g., a "setter" method, a constructor, and/or other injection sites under the container contract. In box 218, the container framework 115 invokes the application component 118 with an invocation 221.

Consequently, the application component 118 in box 224 performs some form of processing that has a dependency on the active resource 130. The application component 118 returns a result 227 or otherwise indicates to the container framework 115 that processing of the active resource 130 is completed. In box 230, the container framework 115 determines that the active resource 130 has been modified. Such a determination may be performed using the result 227 or metadata associated with the active resource 130 (e.g., last modified metadata, versioning information, etc.).

In box 233, in response to determining that the active resource 130 has been modified, the container framework 115 sends a resource request 124b for a modification to server state related to the data resource on the REST server 145. For example, the request may relate to a creation, a deletion, or an update of a server copy of the data resource. The resource request 124b may be generated based at least in part on one or more instructions received in the resource response 127a. In box 236, the REST server 145 modifies the server state related to the data resource, which may include creating, updating, or deleting the representation of the resource in the resource data 148. In box 239, the REST server 145 returns the resource response 127b pertaining to the modification to the container framework 115. Thereafter, the interaction depicted by the sequence diagram 200 ends.

Continuing now to FIG. 2B, shown is a sequence diagram 250 that provides an example of the interaction among the container framework 115, the application component 118, and the REST server 145 according to various embodiments. It is understood that the sequence diagram of FIG. 2B provides merely an example of the many different types of interaction that may be employed in the operation of the container framework 115, the application component 118, and the REST server 145 as described herein. Alternatively, the sequence diagram of FIG. 2B may be viewed as depicting steps of an example method implemented in the various computing devices 103 and 106 (FIG. 1) in the networked environment 100 (FIG. 1) according to various embodiments.

Beginning with box 252, the container framework 115 determines a data dependency of the application component 118. Such a determination may be made with reference to the configuration data 139 (FIG. 1) or through a registration call made by the application component 118 or another entity. In box 254, the container framework 115 injects a stub 256 in the application component 118. The stub 256 allows for lazy loading of a data resource when the dependency is reached by the application component 118. In some cases, the dependency may not be reached, and the data resource will consequently not be obtained.

In box 258, the container framework 115 invokes the application component 118 with an invocation 221. In response, a stub call 260 may be received from the application component 118. In response to the stub call 260, or according to pre-fetching that may be happening concurrently, in box 262, the container framework 115 requests a data resource from the REST server 145 to fulfill the data dependency. A resource request 124a is thereby sent over the network 109 (FIG. 1) to the REST server 145. In some cases, the data resource may be obtained from a cache according to REST.

In box 264, the REST server 145 obtains the data resource in response to the resource request 124a. In so doing, the REST server 145 may access and/or update resource data 148 (FIG. 1) stored in the data store 142 (FIG. 1). Further, the REST server 145 may make any number of calls to various other services executing on the same computing device 106 or a different computing device 106. The REST server 145 returns the resource response 127a to the container framework 115 over the network 109 in response to the resource request 124a. The resource response 127a includes the requested resource 210 or an error message. In some cases, the resource response 127a may be a level three REST message having instructions for updating the included data resource 210.

In box 266, the container framework 115 provides the data resource 210 obtained from the resource response 127a to the application component 118 as the active resource 130 (FIG. 1), which is a local copy in the computing device 103 which is capable of modification by the application component 118. To this end, the container framework 115 may provide the resource 210 via a predefined injection site of the application component 118, e.g., a "setter" method, a constructor, and/or other injection sites under the container contract.

Consequently, the application component 118 in box 268 performs some form of processing that has a dependency on the active resource 130. The application component 118 returns a result 227 or otherwise indicates to the container framework 115 that processing of the active resource 130 is completed. In box 270, the container framework 115 determines that the active resource 130 has been modified. Such a determination may be performed using the result 227 or metadata associated with the active resource 130 (e.g., last modified metadata, versioning information, etc.).

In box 272, in response to determining that the active resource 130 has been modified, the container framework 115 sends a resource request 124b for a modification to server state related to the data resource on the REST server 145. For example, the request may relate to a creation, a deletion, or an update of a server copy of the data resource. The resource request 124b may be generated based at least in part on one or more instructions received in the resource response 127a. In box 274, the REST server 145 modifies the server state related to the data resource, which may include creating, updating, or deleting the representation of the resource in the resource data 148. In box 276, the REST server 145 returns the resource response 127b pertaining to the modification to the container framework 115. Thereafter, the interaction depicted by the sequence diagram 250 ends.

Figure 3:
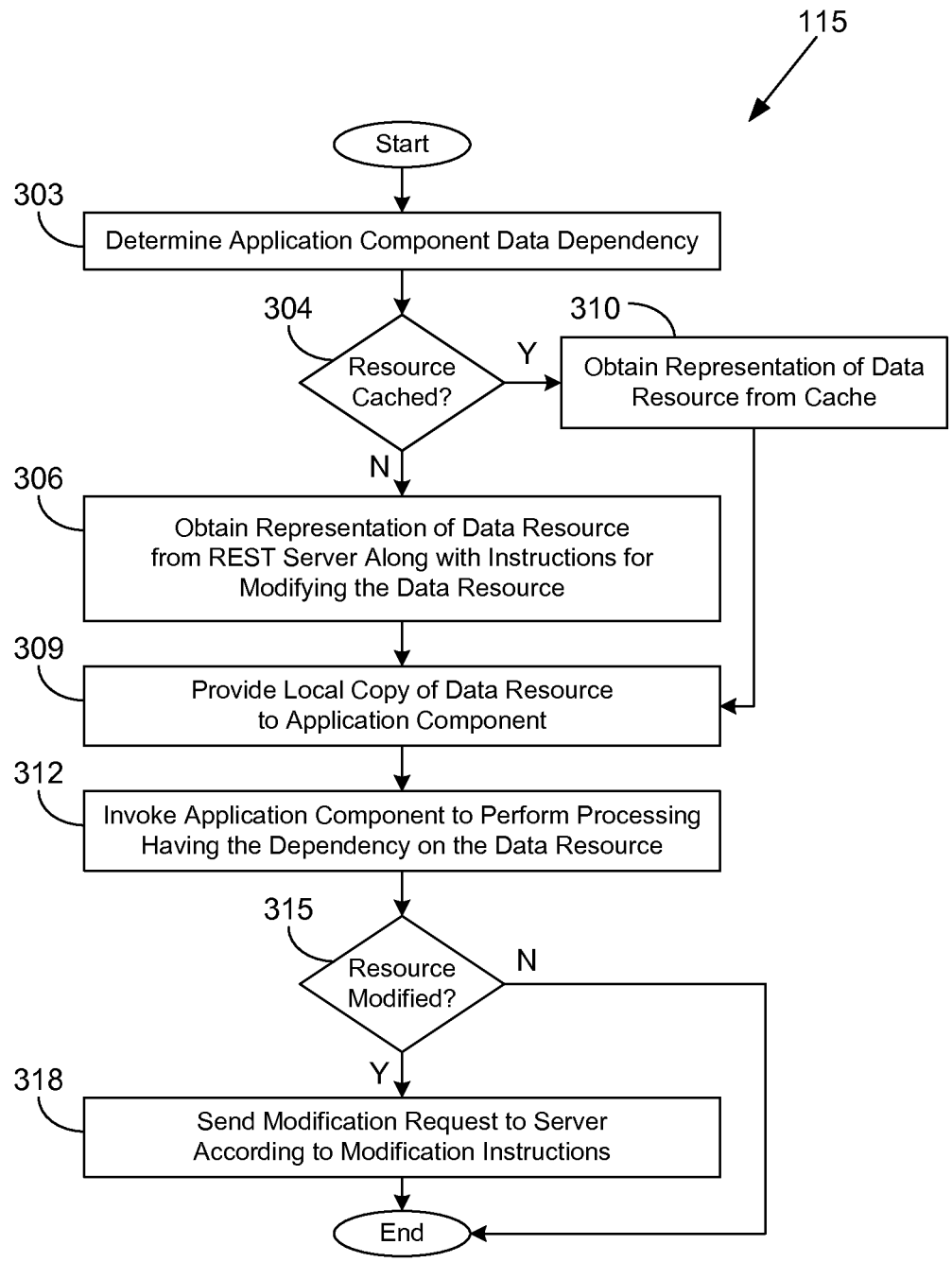
FIG. 3 is a flowchart illustrating one example of functionality implemented as portions of a container framework executed in a computing device in the networked environment of FIG. 1 according to various embodiments of the present disclosure.

Referring next to FIG. 3, shown is a flowchart that provides one example of the operation of a portion of the container framework 115 according to various embodiments. It is understood that the flowchart of FIG. 3 provides merely an example of the many different types of functional arrangements that may be employed to implement the operation of the portion of the container framework 115 as described herein. As an alternative, the flowchart of FIG. 3 may be viewed as depicting an example of steps of a method implemented in the computing device 103 (FIG. 1) according to one or more embodiments.

Beginning with box 303, the container framework 115 determines the existence of a data dependency for an application component 118 (FIG. 1). In box 304, the container framework 115 determines whether the data resource for the data dependency is cached according to REST. If the data resource is not cached, in box 306, the container framework 115 obtains a representation of a data resource in fulfillment of the dependency from a REST server 145 (FIG. 1) over the network 109 (FIG. 1). Along with the data resource, the container framework 115 may obtain instructions for modifying server state related to the data resource. Such instructions may be included within the data resource itself or transmitted along with the representation of the data resource. The container framework 115 proceeds to box 309.

If the data resource is cached, the container framework 115 moves instead from box 304 to box 310. In box 310, the container framework obtains the representation of the data resource from the cache, potentially together with cached modification instructions. The container framework 115 then proceeds to box 309. In box 309, the container framework 115 provides a local copy of the data resource to the application component 118 as the active resource 130 (FIG. 1). In some cases, scoping rules may be applied to the active resource 130. For example, the local copy may be specific to the instance of the application component 118, shared among multiple instances of the application component 118, and/or shared among multiple different application components 118 for a given application.

In box 312, the container framework 115 invokes the application component 118 to perform some type of processing that has a dependency on the active resource 130. In box 315, the container framework 115 determines whether the application component 118 has modified the active resource 130. If the application component 118 has not modified the active resource 130, the portion of the container framework 115 ends.

If the application component 118 has modified the active resource, the container framework 115 proceeds from box 315 to box 318. In box 318, the container framework 115 sends a modification request to the REST server 145 according to the modification instructions obtained in box 306. Thereafter, the portion of the container framework 115 ends.

Figure 4:
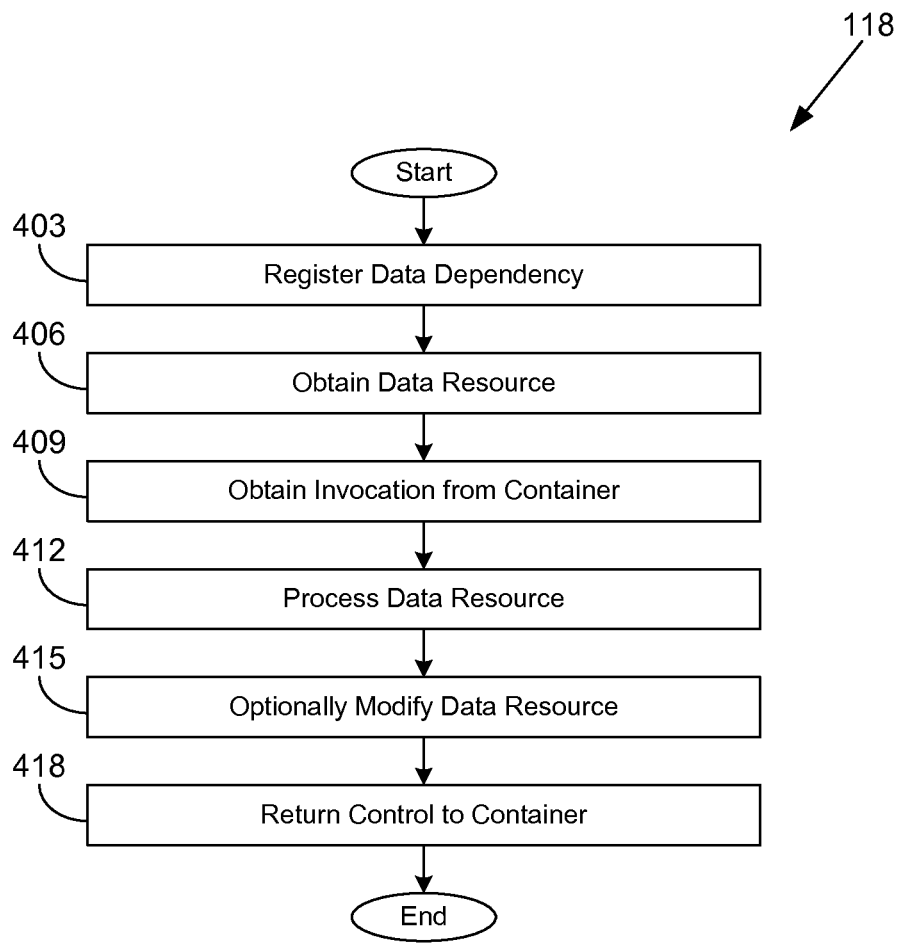
FIG. 4 is a flowchart illustrating one example of functionality implemented as portions of an application component executed in a computing device in the networked environment of FIG. 1 according to various embodiments of the present disclosure.

Moving on to FIG. 4, shown is a flowchart that provides one example of the operation of a portion of the application component 118 according to various embodiments. It is understood that the flowchart of FIG. 4 provides merely an example of the many different types of functional arrangements that may be employed to implement the operation of the portion of the application component 118 as described herein. As an alternative, the flowchart of FIG. 4 may be viewed as depicting an example of steps of a method implemented in the computing device 103 (FIG. 1) according to one or more embodiments.

Beginning with box 403, the application component 118 registers a data dependency with the container framework 115 (FIG. 1). The registration may be upon initial configuration of the application component 118 or at run-time. Also, such a registration may be manual or automatic. The data dependency may be recorded in the configuration data 139 (FIG. 1) according to the container contract.

In box 406, the application component 118 obtains a local copy of the data resource on which it depends from the container framework 115. In box 409, the application component 118 obtains an invocation from the container framework 115. In one embodiment, the application component 118 is invoked by a constructor, where one of the arguments to the constructor is the data resource.

In box 412, the application component 118 processes the data resource. In box 415, the application component 118 optionally modifies the data resource. In box 418, the application component 118 returns control to the container framework 115, which may involve returning a result to the container framework 115. Thereafter, the portion of the application component 118 ends.

Figure 5:
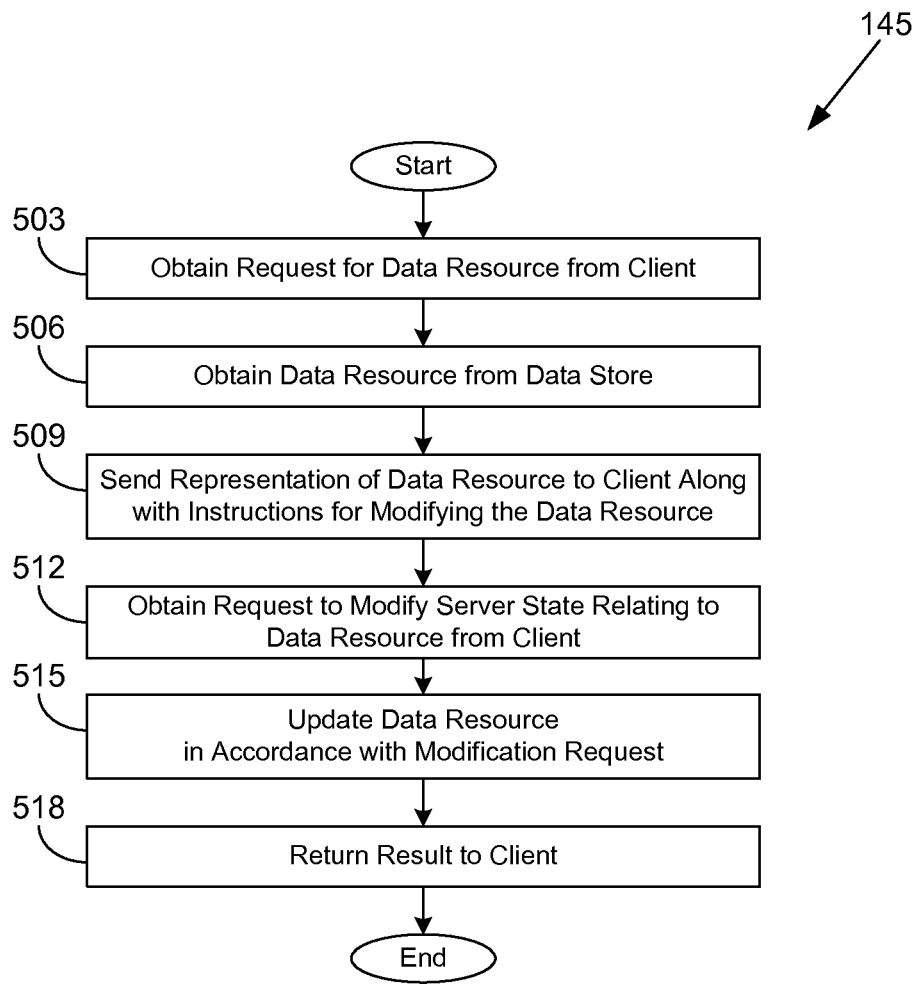
FIG. 5 is a flowchart illustrating one example of functionality implemented as portions of a server executed in a computing device in the networked environment of FIG. 1 according to various embodiments of the present disclosure.

Continuing now to FIG. 5, shown is a flowchart that provides one example of the operation of a portion of the REST server 145 according to various embodiments. It is understood that the flowchart of FIG. 5 provides merely an example of the many different types of functional arrangements that may be employed to implement the operation of the portion of the REST server 145 as described herein. As an alternative, the flowchart of FIG. 5 may be viewed as depicting an example of steps of a method implemented in the computing device 106 (FIG. 1) according to one or more embodiments.

Beginning with box 503, the REST server 145 obtains a request for a data resource from a REST client 121 (FIG. 1). In box 506, the REST server 145 obtains the data resource from the resource data 148 (FIG. 1). In box 509, the REST server 145 sends a representation of the data resource to the REST client 121 along with instructions for modifying the server state related to the data resource. In some cases, the instructions may be included within the data resource itself. The representation and instructions are sent to the REST client 121 by way of the network 109 (FIG. 1).

In box 512, the REST server 145 obtains a request to modify the server state relating to the data resource from the REST client 121 over the network 109. In box 515, the REST server 145 modifies the server state related to the data resource in the resource data 148 in accordance with the modification request. In box 518, the REST server 145 returns the result to the REST client 121 over the network 109. Thereafter, the portion of the REST server 145 ends.

Figure 6:
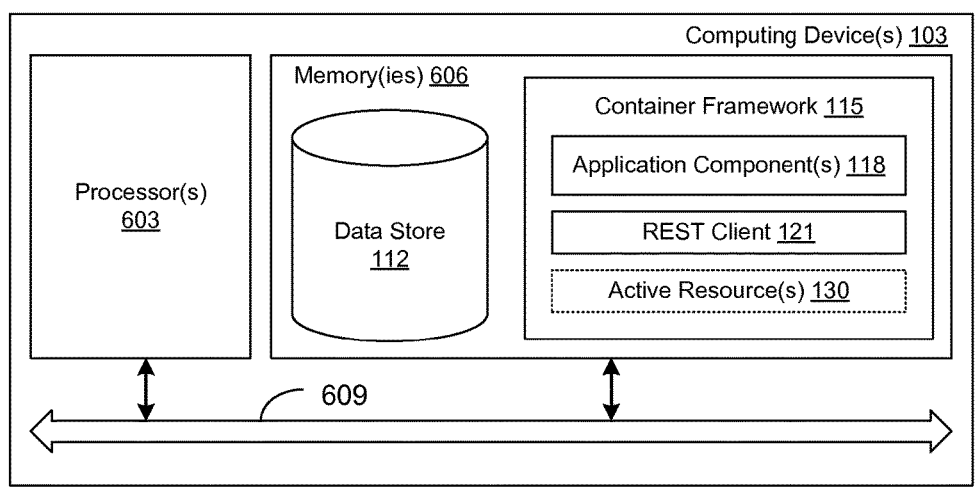
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the container framework 115, the application components 118, the REST client 121, and potentially other applications. Also stored in the memory 606 may be the active resources 130, a data store 112 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the container framework 115, the application components 118, the REST client 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The sequence diagram of FIG. 2A and the flowcharts of FIGS. 3-5 show the functionality and operation of an implementation of portions of the container framework 115, the application component 118, and the REST server 145. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the sequence diagram of FIG. 2A and the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 2-5 may be executed concurrently or with partial concurrence. Further, in some embodiments, one or more of the blocks shown in FIGS. 2-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the container framework 115, the application components 118, and the REST client 121, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium comprising a plurality of computer instructions executable by at least one computing device, wherein upon execution, the plurality of computer instructions cause the at least one computing device to at least:

determine that an application component has a dependency on a data resource based at least in part on an application component configuration received from a data store;
send a first request for the data resource by way of representational state transfer (REST) to a server after determining that the application component has the dependency on the data resource;
receive, in response to the first request, a representation of the data resource and at least one instruction for generating a second request by way of REST for updating a server-side copy of the data resource;
invoke the application component to perform processing that has the dependency on the data resource;
determine, after the application component completes processing, that the application component has modified the data resource; and
effect a modification to a state related to the data resource in the server by way of the second request in response to determining that the application component has modified the data resource.

2. The non-transitory computer-readable medium of claim 1, wherein the data resource is a page containing information about a user, and wherein the at least one instruction includes modifying the information.

3. The non-transitory computer-readable medium of claim 2, wherein the at least one instruction defines a Uniform Resource Identifier (URI), a REST interaction method, and at least one parameter name.

4. The non-transitory computer-readable medium of claim 1, wherein the plurality of computer instructions correspond to a container framework.

5. The non-transitory computer-readable medium of claim 1, wherein the application component does not access the data resource by way of a REST operation.

6. The non-transitory computer-readable medium of claim 1, wherein the plurality of computer instructions further cause the at least one computing device to at least:
generate a first Uniform Resource Identifier (URI) for the data resource;
generate a second URI based at least in part on the at least one instruction; and
wherein the first request for the data resource is sent by way of REST to the server at the first URI.

7. A system, comprising:
at least one computing device; and
a memory storing a container framework executable in the at least one computing device, wherein the container framework causes the at least one computing device to at least:
determine that an application component has a dependency on a data resource based at least in part on an application component configuration received from a data store;
send a first request for the data resource by way of representational state transfer (REST) to a server;
receive, in response to the first request, a data resource and at least one instruction for generating a second request by way of REST for updating a server-side copy of the data resource;
invoke the application component to perform processing that has the dependency on the data resource;
determine that the application component has modified the data resource; and
send the data resource to the server by way of sending the second request to effect a modification to a state in the server related to the data resource.

8. The system of claim 7, wherein the container framework further causes the at least one computing device to at least pass, after receiving the data resource, the data resource through a container injection mechanism to the application component as an active resource.

9. The system of claim 7, wherein the application component corresponds to a Java object.

10. The system of claim 7, wherein the container framework further causes the at least one computing device to at least determine that the application component has modified the data resource after the application component completes processing of the data resource.

11. The system of claim 7, wherein the container framework further causes the at least one computing device to at least provide the data resource to the application component before invoking the application component.

12. The system of claim 7, wherein the container framework further causes the at least one computing device to at least provide the data resource to the application component after invoking the application component.

13. The system of claim 7, wherein the data resource is provided to the application component according to an inversion-of-control design pattern.

14. The system of claim 7, wherein receiving the data resource by way of the first request and the at least one instruction further comprises:
determining that the data resource is cached according to REST; and
receiving the data resource from a cache instead of the server when the data resource is cached.

15. The system of claim 7, wherein the data resource and the at least one instruction are received in a REST response.

16. The system of claim 7, wherein the at least one instruction defines a template for constructing a Uniform Resource Identifier (URI).

17. A method, comprising:
determining, via at least one of one or more computing devices, that an application component has a dependency on a data resource;
sending, via at least one of the one or more computing devices, a first representational state transfer (REST) request for the data resource to a server;
receiving, via at least one of the one or more computing devices, by way of the first REST request, the data resource and at least one instruction for generating a second REST request for updating a server-side copy of the data resource;
executing, via at least one of the one or more computing devices, the application component to perform processing that has the dependency on the data resource;
determining, via at least one of the one or more computing devices after the application component completes execution, that the application component has modified a local copy of the data resource; and
effecting, via at least one of the one or more computing devices, a modification to a state related to the data resource in the server by way of sending the second REST request to the server.

18. The method of claim 17, wherein executing the application component further comprises:
providing, via at least one of the one or more computing devices, the local copy of the data resource to the application component; and
invoking, via at least one of the one or more computing devices, the application component after providing the local copy of the data resource to the application component.

19. The method of claim 18, wherein providing the local copy of the data resource to the application component further comprises providing, via at least one of the one or more computing devices, by a container framework, the local copy of the data resource to the application component according to an inversion-of-control design pattern.

20. The method of claim 17, further comprising modifying, via at least one of the one or more computing devices, the application component to include a stub after determining that the application component has the dependency on the data resource.

\* \* \* \* \*